United States Patent [19]

Holley

[11] 4,407,837
[45] Oct. 4, 1983

[54] SEMOLINA DESSERT MIX

[75] Inventor: Edward J. Holley, Banbury, England

[73] Assignee: General Foods Limited, Banbury, England

[21] Appl. No.: 358,138

[22] Filed: Mar. 15, 1982

[30] Foreign Application Priority Data

Mar. 16, 1981 [GB] United Kingdom ............... 8108149

[51] Int. Cl.³ .................. A23L 1/195; A23L 1/187
[52] U.S. Cl. .................................. 426/578; 426/579; 426/661; 426/639; 426/618
[58] Field of Search ............. 426/578, 579, 661, 618, 426/639

[56] References Cited

U.S. PATENT DOCUMENTS

| | | | |
|---|---|---|---|
| 2,554,143 | 5/1951 | Hinz | 426/579 |
| 2,897,086 | 7/1959 | Sowell et al. | 426/579 |
| 2,901,355 | 8/1959 | Bangert | 426/579 |
| 3,582,350 | 6/1971 | Werbin et al. | 426/579 |
| 4,025,657 | 5/1977 | Cheng et al. | 426/661 |
| 4,192,900 | 3/1980 | Cheng | 426/578 |

FOREIGN PATENT DOCUMENTS 2071478 9/1981 United Kingdom ............... 426/589

*Primary Examiner*—Jeanette M. Hunter
*Attorney, Agent, or Firm*—Joyce P. Hill; Daniel J. Donovan; Thomas R. Savoie

[57] ABSTRACT

A dry semolina dessert powdered composition comprising fine hard wheat semolina, a powdered starch, pulverized sugar, skim milk powder and a spray-dried fat emulsion, the ingredients and their proportions being selected so that the composition when mixing with boiling water and quickly stirred produces a creamy, grainy and thick textured semolina-like hot pudding. The composition allows the quick and convenient production of a ready-to-serve hot semolina pudding from the dry mix of the ingredients, with the textural and creamy taste characteristics of a conventional semolina pudding.

5 Claims, No Drawings

SEMOLINA DESSERT MIX

DESCRIPTION

Technical Field

The present invention relates to a dry semolina dessert powdered mix composition, particularly one which is shelf-stable, and which when mixed and stirred with boiling or hot water is ready-to-serve within about a minute, to provide a hot pudding which has the characteristic texture of a conventional cooked semolina pudding.

An important characteristic of conventionally prepared semolina pudding lies in its 'grainy' yet bodied texture. During cooking or simmering (taking place over a period of at least three minutes), a proportion of the semolina grains swell and burst, to release some gelatinized starch, whilst the remainder merely swell to provide the grainy texture. Some changes in texture and flavor also take place in the optional subsequent procedure of baking in an oven. The other components of such a pudding are milk and usually butter, to provide creaminess, sugar, essentially to provide flavor and sweetness and other flavorings as required.

Attempts to produce such a pudding in the instant form (i.e., not requiring controlled cooking), by merely compounding the dry ingredients of a traditional recipe and adding boiling water have not been successful, since the product fails to thicken and only has a gritty texture. Using a cooked pregelatinized semolina in place of semolina, also does not fully solve the problem of providing a satisfactory graininess with the correct body and texture.

Problems may also arise in the stability of such a product, both on the shelf and in the made-up form.

Disclosure of Invention

We have now found that a satisfactory dry semolina dessert mix composition for this purpose can be made by selecting the appropriate grade and type of semolina, and in particular, its particle size range. Furthermore, it is necessary to introduce an appropriate amount of a rapidly gelatinisable starch and to include in the total composition sugar, skimmed milk powder, and spray-dried fat emulsion in specified proportions. Flavorings and colorings are optional, but will be important in the appearance and taste of the final made up product.

According to the present invention, there is provided a dry semolina dessert powdered composition comprising fine hard wheat semolina (as hereinafter defined), a powdered starch, pulverized sugar, skim milk powder and spray-dried fat emulsion, the ingredients and their proportions being selected so that the composition when mixed with boiling water and quickly stirred produces a creamy, grainy and thick textured semolina-like hot pudding.

The present invention thus allows the quick and convenient production of a ready-to-serve hot semolina pudding from a dry mix of the ingredients, with the textural and creamy taste characteristics of a conventional semolina pudding.

The dry-powdered mix of the present invention generally comprises 15–30% of a fine hard wheat semolina, 14–30% of a powdered starch, preferably maize starch, 20–35% of pulverized sugar (sucrose), 0–11% of a spray dried skim milk powder and 15–25% of a spray-fried fat emulsion (containing preferably between 55 and 70% solid fat), all percentages being by weight based on the total weight of the composition.

By the term "fine hard wheat semolina" as used herein is meant nodules of hard wheat endosperm derived by milling wheat grains, the particle size distribution being such that at least 65% of the particles pass through a 355 Micron sieve at least 15% of the particles pass through a 212 micron sieve and not more than 4% of the particles pass through a 150 micron sieve. Coarse semolinas (i.e. with about 50% of the particles passing through a 600 micron sieve), or medium semolinas are not suitable. By hard wheat, we mean one preferably of the Durum type, although Manitoba wheats may be used, and in general U.S. or Canadian hard wheats are preferred.

By the term "powdered starch" as used herein is meant substantially 100% pure starch having a fine particle size (such that only about 1% by weight is retained on a 106 micron screen) preferably maize starch. Other starches may be used which provide the same rapid thickening properties characterized by suitable tests, and which provide a similar texture. A suitable viscosity test is that provided by a Brookfield viscometer fitted with No. 3 spindle (20 rpm), such that a viscometer reading between 45–75 units (after one minute) is recorded from a fork-thickened mix of 110 g of the dry powder mix and 360 ml boiling water at a product temperature of 75° C.±2°.

Sucrose, in the form of pulverized sugar, not only provides the desired sweetness, but also in the proportions stated, assists the rapid dispersion of the semolina and starch on make-up of the mix with water.

Skim-milk powder and a spray-dried fat emulsion provide the creaminess expected of a conventional semolina pudding, but also in the preferred proportions stated above, assist the rapid dispersion of the semolina and starch ingredients. Whilst, a full-cream milk powder could be used, stability problems by oxidation are likely to ensue.

In the short period of mixing and stirring (i.e., about 30 seconds) the semolina grains, even though fine do not swell and burst sufficiently to release starch in a gelatinized and smooth thickened state, but are however, present in sufficient quantity and swell thus providing the required graininess of texture in the made-up product. The presence of added starch in fine particle form and in the proportions stated produces the required gelatinization to provide the thickness and texture desired.

A further embodiment of this invention lies in the use of a semolina which has been previously heat-treated by standard commercial methods (either wet or dry e.g., by the use of saturated steam for a number of minutes, followed by drying) to inactivate any enzymes present. Inactivation of any fat-splitting lipases present is particularly necessary to ensure adequate shelf-life for the dry mix, to prevent off-flavor development, consequent upon the presence of milk fat and other fats in the composition. The presence of amylases will have a degrading effect on the texture of the made-up product on standing, which effect is obviated in the cooking stage of the conventional methods. Such a pre-treatment will then enable the product to be made up with water at a low temperature, rather than boiling water which will provide a further product advantage. It has been found that such pretreatment of the semolina, together with a controlled moisture content of the total mix to 4% by weight or below, markedly improves the shelf life of the mix.

The composition may also contain colorings and flavorings, e.g. nutmeg and others traditionally associated with semolina pudding, and also a small quantity of salt. The components in such a composition will each be of small particle size to facilitate uniform blending and stability on mixing. The composition may be packed in pouches, envelopes and other protective cartons which afford moisture-barrier features.

The following Examples illustrate a dry powdered semolina dessert mix composition of this invention, and the manner in which it can be used to produce a ready-to-serve dessert preparation.

EXAMPLE 1

| | |
|---|---|
| Fine Durum wheat semolina | 23% |
| Powdered maize starch | 21% |
| Spray dried skim milk powder | 7% |
| Spray-dried fat emulsion, containing 67% hydrogenated coconut oil | 20% |
| Sucrose (pulverized sugar) | 28% |
| Salt | 0.2% |
| Flavoring | 0.7% |
| Coloring | 0.1% |
| | 100% |

13 fl. oz. of boiling water were added to 112 grams of the above dry mix composition, and stirred with a fork for about ½ minute. The product was then ready-to-serve, and was a semolina-like textured hot pudding, with good body, a creamy texture and a desirable graininess.

EXAMPLE 2

The same blend composition was used as in Example 1, except that the Durum wheat semolina had been previously heat treated to destroy enzyme activity, and the total powder mix had a final moisture content of 4% by weight. The composition, on make-up in the same way, had substantially the same desirable characteristics. The shelf life of the dry mix was over one-year with no off-flavors being developed.

What is claimed is:

1. A dry semolina dessert powdered composition which comprises 15–30% of a fine hard wheat semolina, 14–30% of a powdered starch, 20–35% of pulverized sugar, 0–11% of a spray-dried skim milk powder and 15–25% of a spray-dried fat emulsion, all percentages being by weight based on the total weight of the composition.

2. A dry semolina dessert powdered composition as claimed in claim 1 wherein the powdered starch is maize starch.

3. A dry semolina dessert product as claimed in claim 1 wherein the fine hard wheat semolina is of the Durum type.

4. A dry semolina dessert product as claimed in claim 1 wherein the fine hard wheat semolina has been previously heat treated.

5. A dry semolina dessert product as claimed in claim 1 which additionally contains one or more flavorings or colorings.

* * * * *